(12) United States Patent  
Van Gerven et al.

(10) Patent No.: US 8,561,476 B2  
(45) Date of Patent: Oct. 22, 2013

(54) DOCUMENT HANDLING DEVICE WITH SUPPORT FRAME AND TORSION METER MEASURING TORSIONAL DEFORMATION OF THE SUPPORT FRAME

(75) Inventors: Antonius J. J. Van Gerven, Grubbenvorst (NL); Marco T. R. M. Moens, Eindhoven (NL)

(73) Assignee: Oce Technologies B.V., Venlo (NL)

( * ) Notice: Subject to any disclaimer, the term of this patent is extended or adjusted under 35 U.S.C. 154(b) by 106 days.

(21) Appl. No.: 13/051,737

(22) Filed: Mar. 18, 2011

(65) Prior Publication Data

US 2011/0167923 A1 Jul. 14, 2011

Related U.S. Application Data

(63) Continuation of application No. PCT/EP2009/061939, filed on Sep. 15, 2009.

(30) Foreign Application Priority Data

Sep. 19, 2008 (EP) ..................................... 08164734

(51) Int. Cl.  
*G01N 3/20* (2006.01)

(52) U.S. Cl.  
USPC .............................................. 73/847; 73/856

(58) Field of Classification Search  
USPC ........................................... 73/760, 847, 856  
See application file for complete search history.

(56) References Cited

U.S. PATENT DOCUMENTS

| | | | | |
|---|---|---|---|---|
| 3,699,659 A | * | 10/1972 | Roeller | 33/557 |
| 3,866,515 A | * | 2/1975 | Ziegler et al. | 89/37.05 |
| 3,921,424 A | * | 11/1975 | Pearson | 72/1 |
| 3,960,052 A | * | 6/1976 | Smith et al. | 89/37.04 |
| 4,015,678 A | | 4/1977 | Wirth et al. | |
| 4,479,561 A | * | 10/1984 | Feinland et al. | 177/154 |
| 4,637,581 A | | 1/1987 | Wong | |
| 5,287,631 A | * | 2/1994 | Stade | 33/823 |
| 5,676,052 A | * | 10/1997 | Wegrzyn et al. | 101/127.1 |
| 6,779,632 B1 | * | 8/2004 | Parks, III | 182/204 |
| 7,563,207 B1 | * | 7/2009 | Burek | 482/91 |
| 7,861,434 B2 | * | 1/2011 | Knudsen | 33/613 |
| 7,861,752 B1 | * | 1/2011 | Leaf | 144/278.1 |

FOREIGN PATENT DOCUMENTS

| | | |
|---|---|---|
| JP | 4-244880 A | 9/1992 |
| JP | 8-090874 A | 4/1996 |
| JP | 10-293493 A | 11/1998 |
| JP | 2002-271044 A | 9/2002 |

* cited by examiner

*Primary Examiner* — Max Noori  
(74) *Attorney, Agent, or Firm* — Birch, Stewart, Kolasch & Birch, LLP

(57) ABSTRACT

A document handling device has a support frame with four legs, at least one of which is height-adjustable. The support frame includes a torsion meter and a display for displaying a torsion of the support frame. The display is arranged in a position where it is visible for a person adjusting the height of the at least one height-adjustable leg. In an embodiment, it is possible to perform state detection between subsequent droplet ejections, thereby obtaining a highly reliable inkjet process.

9 Claims, 2 Drawing Sheets

DOCUMENT HANDLING DEVICE WITH SUPPORT FRAME AND TORSION METER MEASURING TORSIONAL DEFORMATION OF THE SUPPORT FRAME

CROSS-REFERENCE TO RELATED APPLICATIONS

This application is a Continuation of International Application No. PCT/EP2009/061939, filed on Sep. 15, 2009, and for which priority is claimed under 35 U.S.C. §120, and claims priority under 35 U.S.C. §119(a) to Application No. 08164734.9, filed in Europe on Sep. 19, 2008. The entirety of each of the above-identified applications is expressly incorporated herein by reference.

BACKGROUND OF THE INVENTION

1. Field of the Invention

The present invention relates to a document handling device having a support frame with four legs, at least one of which is height-adjustable.

2. Background of the Invention

A document handling device, e.g. a printer, a copier or a scanner, typically comprises a number of mechanical components that need to be perfectly aligned and adjusted relative to one another or to a recording medium that is to be scanned or printed on in the device. Examples of such mechanical components are a guide rail for a reciprocating printhead carriage of an ink jet printer, a rotating mirror or an LED array in a laser printer, a scanning mirror assembly and/or a CCD array in a scanner and the like. Since both, the transport and guide device for the recording medium, e.g., paper, and the mechanical components are directly or indirectly mounted on the support frame, even a slight torsional deformation of the support frame may deteriorate the alignment and/or adjustment of the mechanical components, and this will have negative consequences on the function of the device, i.e. the quality of printed or scanned images.

A torsion of the support frame is typically induced when the document handling device is installed on an uneven floor. A well-known counter measure for avoiding such torsion is to precisely level the support frame by compensating for the unevenness of the floor, so that the frame will be precisely level and torsion-free.

U.S. Pat. No. 4,637,581 discloses a self-levelling support frame.

JP 04/244 880 A discloses a printer, wherein any strain of a printer case is detected with a strain gauge. When the strain gauge detects an installment state where the printer case is likely to be subject to excessive bending force or torsional force, the strain gauge causes the control system of the printer to prevent printing operations until the strain has been relieved.

SUMMARY OF THE INVENTION

It is an object of the present invention to provide a document handling device which facilitates the operation of installing the device and assures a proper function of the device.

In order to achieve this object, the document handling device according to the present invention includes a support frame that comprises a torsion meter and a display for displaying a torsion of the support frame, the display being arranged in a position where it is visible for a person adjusting the height of the at least one height-adjustable leg.

When this device is installed on an uneven floor, the display will show that the support frame is subject to a certain torsion. The operator may then adjust the height of the height adjustable leg until the display shows that the support frame is torsion-free. This does not necessarily mean that the support frame has been leveled, but at least the frame will be torsion-fee, so that a proper alignment and adjustment of the mechanical components and hence a proper function of the device will be assured.

The present invention is particularly useful for large format printers or scanners capable of handling documents with the format A2 or larger.

More specific features of the invention are indicated in the dependent claims.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
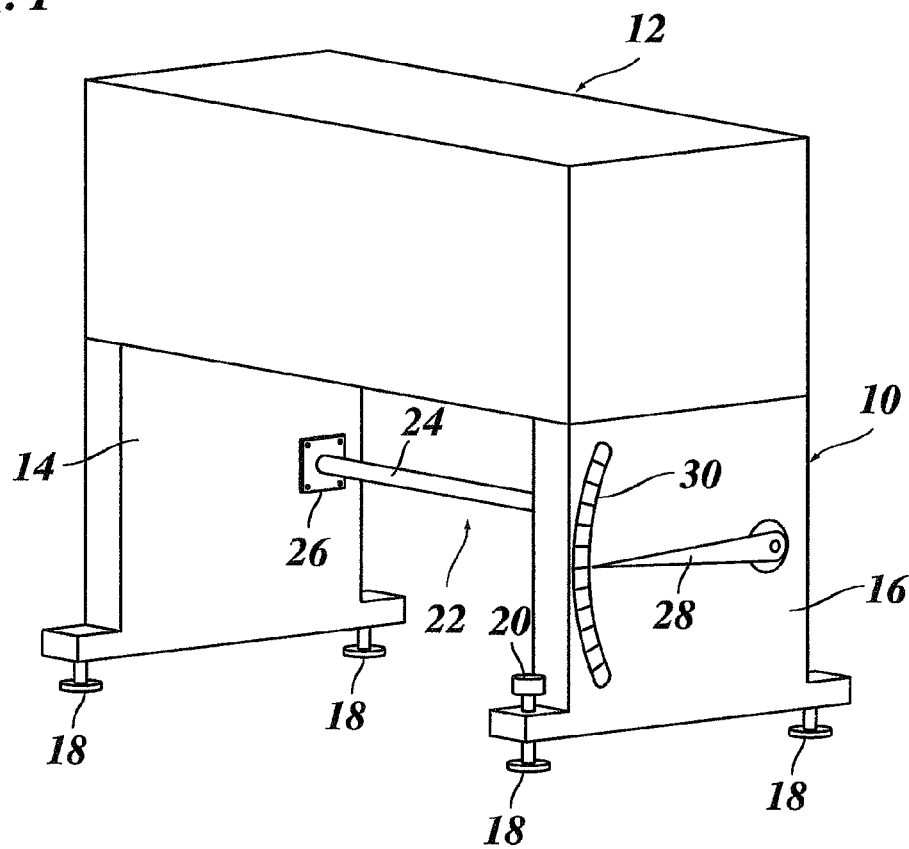
FIG. 1 is a simplified perspective view of a document handling device according to the present invention

The present invention will now be described with reference to the accompanying drawings, wherein the same reference numerals have been used to identify the same or similar elements throughout the several views.

As is shown in FIG. 1, a document handling device, e.g. a printer, comprises a support frame 10, which supports a casing 12 of the device. As is well known in the art, the casing 12 accommodates a number of mechanical components that have to be aligned and adjusted relative to one another with high precision in order to assure a proper function of the device. In order to maintain this proper alignment and adjustment, it is necessary to install the device in such a manner that the casing 12 and its support frame 10 will be torsion-fee.

In the shown embodiment, the support frame 10 is formed by two side members 14 or 16, each of which has two legs 18, so that the support frame has four legs in total. One of the legs 18 of the side member 16 has a height adjusting mechanism 20 permitting adjustment of the height of that leg 18 so as to compensate for a possible unevenness of the floor on which the device has been installed. In the example shown, the height adjusting mechanism 20 is a manually operated screw-spindle mechanism.

A torsion meter 22 is formed by a shaft 24 that extends over the entire width of the support frame (the direction in which this frame has its largest dimension) from the first side member 14 to the second side member 16. The shaft 24 is rigidly connected to the first side member 14 by a socket 26 and is rotatably supported with its opposite end in the second side member 16. An end portion of the shaft 24 which penetrates through the side member 16 carries a pointer 28 which, together with a scale 30 formed on the outer face of the side member 16, forms a display for displaying a torsion of the support frame 10 as measured by the torsion meter 22.

It will be understood that a person manually operating the height adjusting mechanism 20 of the height adjustable leg 18 by can readily watch the display 28, 30.

Figure 2:
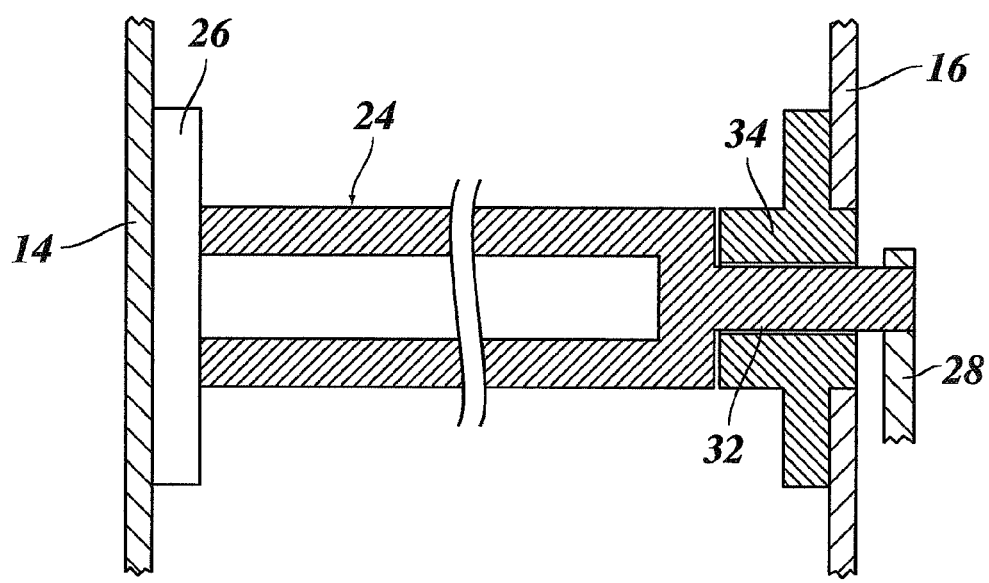
FIG. 2 shows essential parts of a support frame of the device in a horizontal cross-section.

As is shown in FIG. 2, the shaft 24 is formed by a tube that has by itself a high torsional stability. At the end facing the second side member 16, the shaft has a reduced end portion 32, which is supported in a bearing 34 and carries the pointer 28. Thus, the shaft 24 is non-rotatably connected to the first side member 14 but is rotatable relative to the second side member 16.

Figure 3:
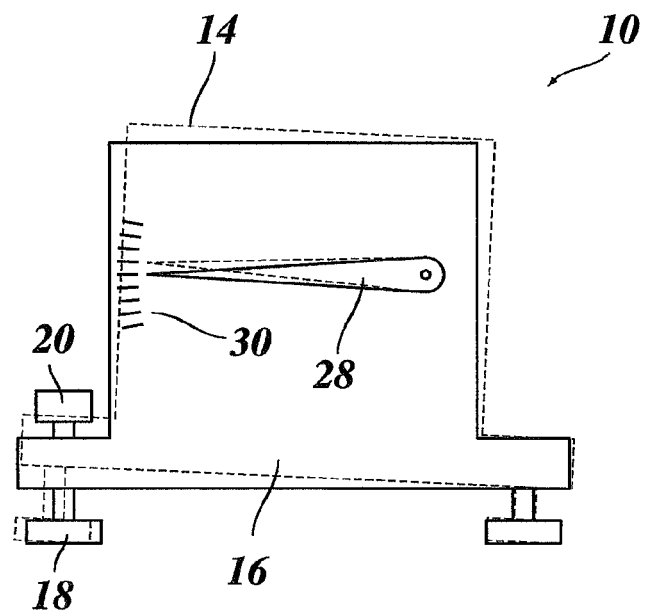
FIG. 3 is a schematic view illustrating the function of a torsion meter.

FIG. 3 shows a side view of the second side member 16 of the support frame 10 in a state where this support frame is subject to a torsional deformation. The first side member 14 has been shown in broken lines in FIG. 3 and in a slightly rotated position, as a result of the torsional deformation. Thanks to the rigidity of the shaft 24, the pointer 28 will rotate relative to the second side member 16 together with the first side member 14 as has also been shown in broken lines in FIG. 3. As a result of the deformation of the support frame, the shaft 24 may also be subject to some bending strains, which, however, have no effect on the rotation relative to the second side member 16. Thus, the amount of torsional deformation can be read on the scale 30.

It is preferred that the shaft 24 extends in the direction in which the support frame 10 has its largest dimension. Further, if a mechanical display is used where a pointer or the like is mechanically driven by the torsion meter, it is preferable that the pointer 28 is relatively long, so as to magnify the effect of the torsion.

When an operator installs the device, he watches the display 28, 30 and rotates the height adjustment device 20 so as to reduce to zero the torsion shown on the display. When a state with zero torsion has been reached, it will be assured that the mechanical components that are directly or indirectly supported by the support frame 10 will be proper aligned and adjusted relative to one another, even when the support frame 10 and the casing 12 have a relatively lightweight and inexpensive construction with poor torsional strength.

Figure 4:
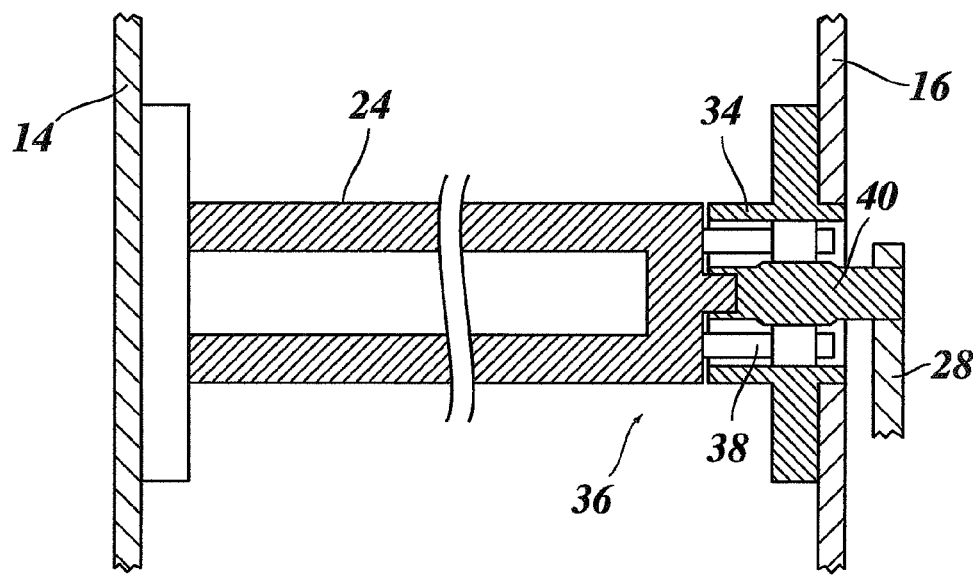
FIG. 4 is a sectional view similar to FIG. 2 but showing a modified embodiment of the present invention.

FIG. 4 illustrates a modified embodiment which differs from the embodiment shown in FIG. 2 in that the bearing 34 for the shaft 24 accommodates a transmission, more specifically, a planetary gear transmission 36, which translates the rotation of the shaft 24 relative to the side member 16 into a rotation of the pointer 28 by a significantly larger angle. In the example shown, the end of the shaft 24 is rigidly connected to a planet carrier 38, whereas the pointer 28 is connected to a sun gear 40, and the bearing 34 serves as an internally toothed hollow gear of the planetary transmission. Of course, any other type of mechanical transmission may be used as well.

In yet another embodiment which has not been shown, the torsion meter may be an electronic device delivering an electric (analogue or digital) torsion signal which will be displayed on an electronic display.

It is noted that the embodiment illustrated in FIG. 1 includes a manually operated height adjusting mechanism 20. One having ordinary skill in the art would also recognize that an automatic adjusting device, for example a motor, could also be used to accomplish adjusting of the legs 18.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A document handling device, comprising:
 a support frame, said support frame comprising:
  a plurality of legs, at least one of said plurality of legs being height-adjustable;
 a torsion meter measuring a torsional deformation of the support frame; and
 a display connected to the torsion member and displaying the torsional deformation of the support frame measured by the torsion meter,
 wherein the display is arranged at a position where the display is visible for a person adjusting the height of the at least one height-adjustable leg.

2. The document handling device according to claim 1, wherein the support frame further comprises a first side member and a second side member spaced apart from one another in a direction in which the device has a largest dimension thereof.

3. The document handling device according to claim 2, wherein each of said first and second side members has at least two of said plurality of legs, and the display is provided on the second side member having the at least one height-adjustable leg.

4. The document handling device according to claim 2, wherein the torsion meter comprises a shaft that is rigidly connected to the first side member and is rotatably supported in the second side member.

5. The document handling device according to claim 3, wherein the torsion meter comprises a shaft that is rigidly connected to the first side member and is rotatably supported in the second side member.

6. The document handling device according to claim 4, wherein the display comprises a pointer and a scale, one of the pointer and the scale being mechanically connected to an end of the shaft that is rotatably supported in the second side member, so as to display a rotation of the shaft relative to the second side member.

7. The document handling device according to claim 5, wherein the display comprises a pointer and a scale, one of the pointer and the scale being mechanically connected to an end of the shaft that is rotatably supported in the second side member, so as to display a rotation of the shaft relative to the second side member.

8. The document handling device according to claim 1, wherein the torsion meter comprises a first member connected to a first side frame of the support frame and a transmission magnifying a rotation of said first member relative to a second side member of the support frame.

9. The document handling device according to claim 1, wherein the document handling device is a printer or a scanner handling at least one document.

* * * * *